(12) United States Patent
Kim et al.

(10) Patent No.: US 11,500,800 B2
(45) Date of Patent: Nov. 15, 2022

(54) SEMICONDUCTOR DEVICES INCLUDING COMMAND PRIORITY POLICY MANAGEMENT AND RELATED SYSTEMS

(71) Applicant: Samsung Electronics Co., Ltd., Suwon-si (KR)

(72) Inventors: Dong-Min Kim, Hwaseong-si (KR); Jeong-Woo Park, Hwaseong-si (KR); Wook Han Jeong, Pocheon-si (KR); Jin Hwan Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 17/035,652

(22) Filed: Sep. 28, 2020

(65) Prior Publication Data
US 2021/0011869 A1    Jan. 14, 2021

Related U.S. Application Data

(62) Division of application No. 16/005,063, filed on Jun. 11, 2018, now Pat. No. 10,817,445.

(30) Foreign Application Priority Data

Nov. 7, 2017    (KR) .......................... 10-2017-0147050

(51) Int. Cl.
*G06F 13/10*    (2006.01)
*G06F 3/06*    (2006.01)
*G06F 13/26*    (2006.01)

(52) U.S. Cl.
CPC ............ *G06F 13/26* (2013.01); *G06F 13/102* (2013.01)

(58) Field of Classification Search
None
See application file for complete search history.

(56) References Cited

U.S. PATENT DOCUMENTS

| | | |
|---|---|---|
| 7,853,736 B2 | 12/2010 | Ueno |
| 8,271,749 B2 | 9/2012 | Yamaguchi et al. |
| 9,189,172 B1 | 11/2015 | McLeran et al. |
| 9,347,254 B2 | 5/2016 | Sullivan |
| 9,372,715 B2 | 6/2016 | Yu et al. |
| 9,519,943 B2 | 12/2016 | Rogers et al. |
| 2005/0144375 A1 | 6/2005 | Bains et al. |
| 2016/0065588 A1 | 3/2016 | Wheeler |
| 2017/0039002 A1 | 2/2017 | Myouga |
| 2017/0102884 A1* | 4/2017 | Kim ..................... G06F 3/0613 |
| 2018/0364919 A1* | 12/2018 | Hall, Jr. ................ G06F 3/0683 |

FOREIGN PATENT DOCUMENTS

| | | |
|---|---|---|
| JP | 2016532950 A | 10/2016 |
| KR | 1020120017911 A | 2/2012 |

* cited by examiner

*Primary Examiner* — Scott C Sun
(74) *Attorney, Agent, or Firm* — Muir Patent Law, PLLC

(57) ABSTRACT

Provided is a semiconductor device and a semiconductor system. A semiconductor device can include a command priority policy manager circuit which generates command priority policy information including a command priority compliance policy for a command directed to a device. A host interface circuit can be coupled to the command priority policy manager circuit to receive the command priority policy information from the command priority policy manager circuit, where the host interface circuit operable to transmit the command priority policy information via an electrical interface to the device.

20 Claims, 11 Drawing Sheets

414

| Bit Number: | 7 | 6 | 5 | 4 | 3 | 2 | 1 | 0 |
|---|---|---|---|---|---|---|---|---|
| Field Name: | First Field | Second Field | | Reserved | | Third Field | | |
| | Enable | Mode | | | | Host | LU | CMD Group |
| Value: | 0, 1 | 0, 1, 2 | | N/A | | 0, 1 | 0, 1 | 0, 1 |

FIG. 4

| | 402 | | 404 | | 400 | | |
|---|---|---|---|---|---|---|---|
| | COMMAND UPIU | | | | | | |

| 0 xx00 0001b | 1 Flags | 2 LUN | 3 Task Tag |
|---|---|---|---|
| 4 IID / Command Set Type | 5 CPP | 6 Reserved | 7 Reserved |
| 8 Total EHS Length (00h) | 9 Reserved | 10 (MSB) Data Segment Length (0000h) | 11 (LSB) |
| 12 (MSB) | 13 | 14 (MSB) | 15 (LSB) |
| Expected Data Transfer Length | | | |
| 16 CDB[0] | 17 CDB[1] | 18 CDB[2] | 19 CDB[3] |
| 20 CDB[4] | 21 CDB[5] | 22 CDB[6] | 23 CDB[7] |
| 24 CDB[8] | 25 CDB[9] | 26 CDB[10] | 27 CDB[11] |
| 28 CDB[12] | 29 CDB[13] | 30 CDB[14] | 31 CDB[15] |
| Header E2ECRC (omit if HD=0) | | | |

404

| Bit Number: | 7 | 6 | 5 | 4 | 3 | 2 | 1 | 0 |
|---|---|---|---|---|---|---|---|---|
| Field Name: | First Field | Second Field | | | | Third Field | | |
| | Enable | Mode | | Reserved | | Host | LU | CMD Group |
| Value: | 0, 1 | 0, 1, 2 | | N/A | | 0, 1 | 0, 1 | 0, 1 |

FIG. 10

| | | 412 | | 410 | | 414 | |
|---|---|---|---|---|---|---|---|

| QUERY REQUEST UPIU ||||
|---|---|---|---|
| 0<br>xx01 0110b | 1<br>Flags | 2<br>CPP | 3<br>Task Tag |
| 4<br>Reserved | 5<br>Query Function | 6<br>Reserved | 7<br>Reserved |
| 8<br>Total EHS Length (00h) | 9<br>Reserved | 10  (MSB)<br>Data Segment Length | 11  (LSB) |
| 12 | 13 | 14 | 15 |
| Transaction Specific Fields ||||
| 16 | 17 | 18 | 19 |
| Transaction Specific Fields ||||
| 20 | 21 | 22 | 23 |
| Transaction Specific Fields ||||
| 24 | 25 | 26 | 27 |
| Transaction Specific Fields ||||
| 28 | 29 | 30 | 31 |
| Reserved ||||
| Header E2ECRC (omit if HD=0) ||||
| k<br>Data[0] | k+1<br>Data[1] | k+2<br>Data[2] | k+3<br>Data[3] |
| ... | ... | ... | ... |
| k+Length-4<br>Data[Length-4] | k+Length-3<br>Data[Length-3] | k+Length-2<br>Data[Length-2] | k+Length-1<br>Data[Length-1] |
| Data E2ECRC (omit if DD=0) ||||

414

| Bit Number: | 7 | 6 | 5 | 4 | 3 | 2 | 1 | 0 |
|---|---|---|---|---|---|---|---|---|
| Field Name: | First Field | Second Field | | | | Third Field | | |
| | Enable | Mode | | Reserved | | Host | LU | CMD Group |
| Value: | 0, 1 | 0, 1, 2 | | N/A | | 0, 1 | 0, 1 | 0, 1 |

SEMICONDUCTOR DEVICES INCLUDING COMMAND PRIORITY POLICY MANAGEMENT AND RELATED SYSTEMS

This application is a Divisional application of U.S. patent application Ser. No. 16/005,063 filed on Jun. 11, 2018, now allowed, which claims priority under 35 USC § 119 to Korean Patent Application No. 10-2017-0147050 filed on Nov. 7, 2017 in the Korean Intellectual Property Office, the disclosure of each of which is incorporated herein in its entirety by reference.

BACKGROUND

The present invention relates to a semiconductor device and a semiconductor system. A storage system can include a host and a device capable of sending and receiving data to and from each other via various interfaces. Examples of various interfaces include a UFS (Universal Flash Storage), a SCSI (Small Computer System Interface), a SAS (Serial Attached SCSI), a SATA (Serial Advanced Technology Attachment), a PCIe (Peripheral Component Interconnect Express), an eMMC (embedded MultiMediaCard), a FC (Fiber Channel), an ATA (Advanced Technology Attachment), an IDE (Intergrated Drive Electronics), a USB (Universal Serial Bus), an IEEE 1394 (Firewire), and the like.

In such a storage system, the host transmits a plurality of commands to be processed by the device via the interface, and the device which has received the commands may sequentially process the plurality of commands in accordance with a predetermined command priority.

However, when the command priority does not adequately reflect the operating status of the storage system, may be difficult for the device to normally process a plurality of commands, or the device may perform processing inefficiently. For example, there may be risk in which the command having a low priority is not continuously executed resulting in a time-out, or a plurality of commands are processed in an inefficient order, which can increase the processing time.

SUMMARY

Embodiments according to the invention can provide semiconductor devices including command priority policy management and related systems. Pursuant to these embodiments, a semiconductor device can include a command priority policy manager circuit which generates command priority policy information including a command priority compliance policy for a command directed to a device. A host interface circuit can be coupled to the command priority policy manager circuit to receive the command priority policy information from the command priority policy manager circuit, where the host interface circuit operable to transmit the command priority policy information via an electrical interface to the device.

In some embodiments, a semiconductor device can include a device interface circuit operable to receive command priority policy information from a host via an electrical interface, the command priority policy information can include a command priority compliance policy for a command received from the host. A command priority policy manager circuit can be operable to determine whether to comply with a priority for processing the command received from the host in accordance with the command priority policy information received from the host.

In some embodiments, a semiconductor system can include a host and a device connected to each other via an electrical interface, wherein the host includes a first command priority policy manager circuit operable to generate command priority policy information including a command priority compliance policy on a command to be processed by the device. A host interface circuit can be coupled to the first command priority policy manager circuit, operable to receive the command priority policy information from the first command priority policy manager circuit and operable to transmit the command priority policy information to the device, wherein the device includes a device interface circuit operable to receive the command priority policy information from the host. A second command priority policy manager circuit can be coupled to the device interface circuit, where the second command priority policy manager circuit can be operable to determine whether to comply with a priority for processing the command received from the host, in accordance with the command priority policy information received from the host.

BRIEF DESCRIPTION OF THE DRAWINGS

The above and other aspects and features of the present invention will become more apparent by describing in detail example embodiments thereof with reference to the attached drawings, in which:

FIGS. 3 to 8 are schematic views for explaining the operation of the semiconductor system according to an embodiment of the present invention;

FIGS. 9 to 11 are schematic views for explaining the operation of the semiconductor system according to an embodiment of the present invention;

FIGS. 12 to 14 are schematic views for explaining the operation of the semiconductor system according to an embodiment of the present invention;

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Figure 1:
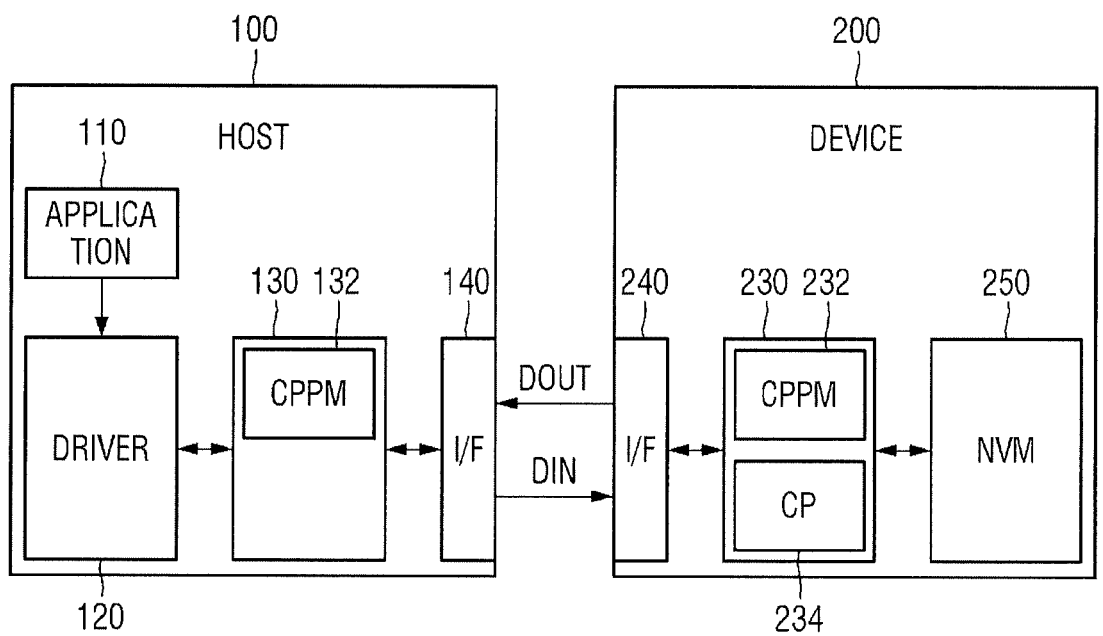
FIGS. 1 and 2 are schematic views for explaining a semiconductor system according to an embodiment of the present invention.
Figure 2:
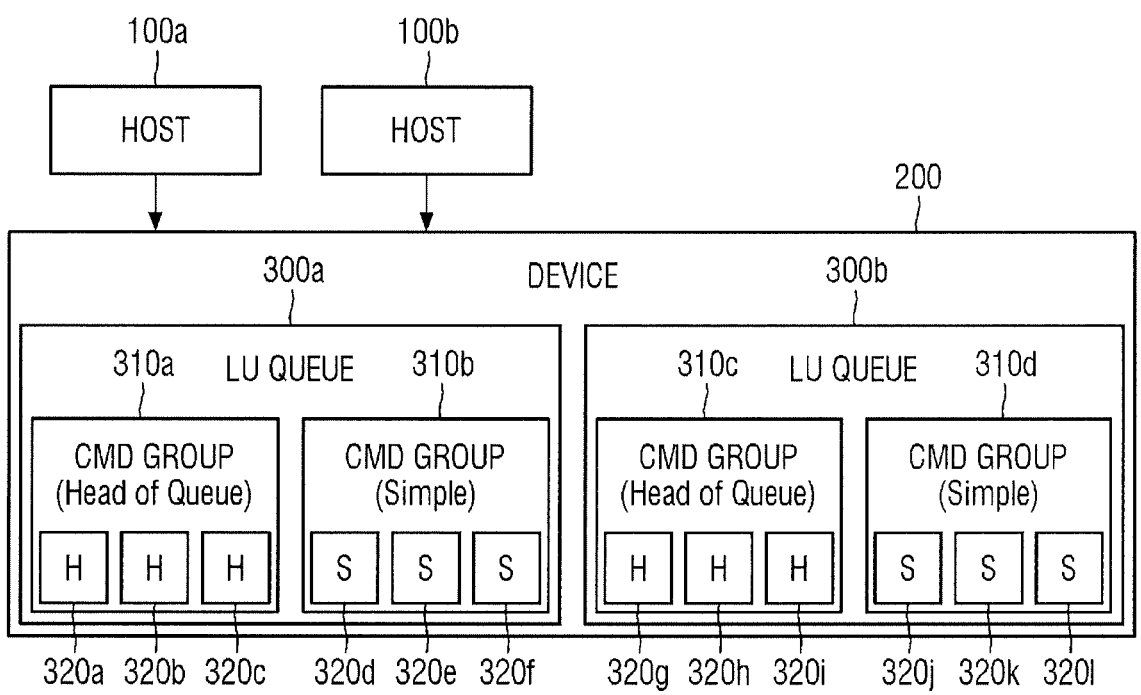

FIGS. 1 and 2 are schematic views for explaining a semiconductor system according to an embodiment of the present invention.

Referring to FIG. 1, a semiconductor system 1 according to an embodiment of the present invention includes a host 100 and a device 200.

In some embodiments of the present invention, the host 100 and the device 200 may be connected to each other, via electrical interfaces such as a UFS (Universal Flash Storage), a SCSI (Small Computer System Interface), a SAS (Serial Attached SCSI), a SATA, (Serial Advanced Technology Attachment), PCIe (Peripheral Component Interconnect Express), an eMMC (embedded MultiMediaCard), a FC (Fiber Channel), an ATA (Advanced Technology Attachment), an IDE (Intergrated Drive Electronics), a USB (Universal Serial Bus), and an IEEE 1394 (Firewire). However, the scope of the present invention is not limited thereto, but may be applied to any interface that allows data to be sent and received between the host 100 and the device 200.

The host 100 includes an application 110, a driver 120, a host controller 130, and a host interface 140.

In some embodiments of the present invention, the host 100 may further include a buffer memory. The buffer memory may be used as a main memory of the host 100, or may be used a cache memory, a temporary memory, or the like for temporarily storing data. In some embodiments of the present invention, the buffer memory may include volatile memory including DRAM (Dynamic Random Access Memory), but the scope of the present invention is not limited thereto.

The application 110 is executed by the host 100 and may control the semiconductor system 1 on the basis of a command set usable in the semiconductor system 1. In some embodiments of the invention, the application 110 may support a SCSI (Small Computer System Interface) command set, but the scope of the present invention is not limited thereto.

The driver 120 may drive the device 200 connected to the host 100. Specifically, the driver 120 receives a command for controlling the device 200 from the application 110, and processes the command using the host controller 130. Thereafter, the driver 120 may provide the processing result to the application 110.

The application 110 and the driver 120 may be provided as software, but the scope of the present invention is not limited thereto.

The host controller 130 controls the overall operations of the host 100. For example, as a response to a write command received from the driver 120, the host controller 130 may transmit the data stored in the buffer memory to the device 200 via the host interface 140. Further, the host controller 130 may also receive data from the device 200 via the host interface 140, as a response to a read command received from the driver 120.

The host interface 140 may send and receive data to and from the device interface 240 of the device 200 via the data lines (DIN, DOUT).

In some embodiments of the present invention, the host interface 140 and the device interface 240 may include a physical layer (PHY layer) for directly transmitting and receiving data between the host 100 and the device 200, and a data transfer layer capable of generating and managing packets of data to be transmitted between the host 100 and the device 200, but the scope of the present invention is limited thereto.

The device 200 includes a device controller 230, a device interface 240, and a non-volatile memory (NVM) 250.

The device controller 230 controls the overall operations of the device 200. For example, the device controller 230 may perform operations for writing, reading, or erasing the data requested by the host 100 to the nonvolatile memory 250. The device 200 may further include a buffer memory.

The nonvolatile memory 250 may include a flash memory, an MRAM (Magnetoresistive Random Access Memory), a PRAM (Phase-change Random Access Memory), a FeRAM (Ferroelectric Random Access Memory) and the like, but the scope of the present invention is not limited thereto.

Hereafter, for the sake of convenience, the description will be provided on the assumption that the host 100 and the device 200 are connected to each other via a UFS (Universal Flash Storage) electrical interface, the host 100 is a UFS host, and the device 200 is a UFS memory device. However, the scope of the present invention is not limited thereto, and is applicable to any storage system which uses an arbitrary interface including the electrical interface illustrated in FIG. 1.

In the present embodiment, the host controller 130 of the host 100 may include a command priority policy manager (CPPM) 132.

The command priority policy manager 132 generates a command priority compliance policy on the commands to be processed by the device 200, and may provide the above-mentioned policy to the device 200.

Specifically, the command priority policy manager 132 generates a data structure called command priority policy information (CPPI). Further, the command priority policy manager 132 may record values for determining whether to allow the device 200 to not comply with the predetermined command priority or determining whether to cause the device 200 to comply with the predetermined command priority, on the command priority policy information.

In some embodiments of the present invention, the predetermined command priority may be predefined by the interface or protocol adopted by the semiconductor system 1. That is, the command priority policy manager 132 of the host 100 may dynamically determine whether to cause the device 200 to comply with the predetermined command priority, by reflecting the operating status of the semiconductor system 1.

The command priority policy information generated by the command priority policy manager 132 of the host 100 may be transmitted to the device 200 via the host interface 140.

Next, the device controller 230 of the device 200 may include a command priority policy manager (CPPM) 232, and a command parser (CP) 234.

The command priority policy manager 232 identifies the values included in the command priority policy information received from the host 100 via the device interface 240, and determines whether the device 200 complies with a predetermined priority in processing the command received from the host 100.

The command parser 234 parses the command received from the host 100.

For the sake of convenience and clarity of explanation, the command priority policy manager 132 of the host 100 and the command priority policy manager 232 of the device 200 will also be expressed as a first command priority policy manager 132 and a second command priority policy manager 232, respectively.

Referring now to FIG. 2, the semiconductor system 1 according to an embodiment of the present invention may include a plurality of hosts 100a and 100b, and a device 200. That is, the device 200 may process the command received from the first host 100a and may process the command received from the second host 100b.

From the viewpoint of the device 200, respective processing priorities may exist for the commands received from the first host 100a and for the commands received from the second host 100b. For example, the command received from the first host 100a may have a high priority, and the priority of processing among the commands received from the second host 100b may have a normal priority.

The device 200 may include a plurality of logical unit queues (LU Queue) 300a and 300b. The plurality of commands 320a to 320l to be processed by the device 200 are inserted into the logical unit queues 300a and 300b of the device 200 to wait for the processing. Thereafter, when reaching the processing order, the plurality of commands 320a to 320l may be removed from the logical unit queues.

Respective processing priorities may also exist for the commands included in the first logical unit queue 300a and the commands included in the second logical unit queue 300b. For example, a command included in the first logical unit queue 300a may have a high priority, and a command included in the second logical unit queue 300b may have a normal priority.

A plurality of command groups may be defined in one logical unit queue 300a. The logical unit queue 300a may include a command group 310a having a head-of-queue priority, and a command group 310b having a simple priority. For example, the head-of-queue priority may be defined to be higher than the simple priority. Similarly, the logical unit queue 300b may include a command group 310c having the head-of-queue priory, and a command group 310d having the simple priority.

Furthermore, the priority may also be defined among the commands 320a to 320l included in each of the command groups 310a to 310d. For example, among the commands 320a, 320b, and 320c included in the command group 310a, for example, the most recently inserted command 320a has the highest priority, and the secondarily inserted command 320b may have the next priority. Similarly, among the commands 320d, 320e, and 320f included in the command group 310b, for example, the most recently inserted command 320d has the highest priority, and the secondarily inserted command 320e may have the next priority.

Hereinafter, an operation of dynamically determining whether to cause the device 200 to comply with the predefined command priority, by reflecting the operating status of the semiconductor system 1 is described in greater detail.

FIGS. 3 to 8 are schematic views for explaining the operation of the semiconductor system according to the embodiment of the present invention.

Figure 3:
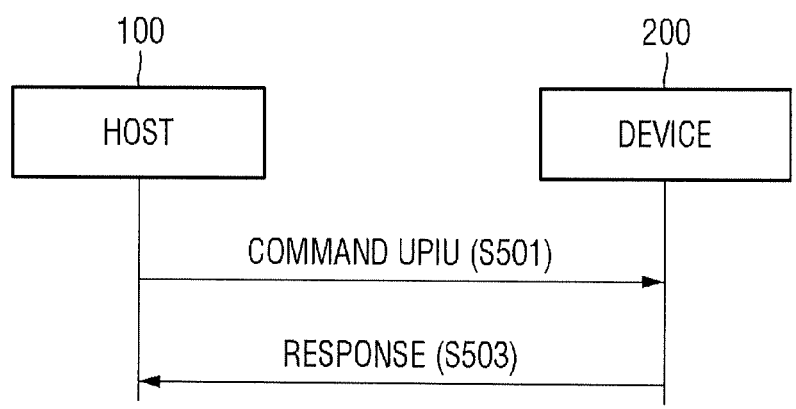

Referring to FIG. 3, the command priority policy information generated by the command priority policy manager 132 of the host 100 may be transmitted to the device 200, while being included in the command transmitted to the device 200 from the host 100.

For example, the UFS interface defines transactions in the form of request-response operation performed between the host 100 and the device 200, and the transaction is made up of packets such as UPIU (UFS Protocol Information Unit).

The UPIU includes a transaction code, and this code may define the contents, functions, uses, etc. of the UPIU. For example, when the transaction code of certain UPIU is "xx00 0001b", the UPIU corresponds to "command UPIU", and when the transaction code of certain UPIU is "xx10 0001b", the UPIU may correspond to "response UPIU".

Also, when the transaction code of certain UPIU is "xx01 0110b", the UPIU corresponds to "query request UPIU", and when the transaction code of certain UPIU is "xx11 0110b", the UPIU may correspond to "query response UPIU".

A command UPIU with the transaction code of "xx00 0001b" is generated from the host 100 and transmitted to the logical unit (LU) of the device 200. The command UPIU includes a command descriptor block including a command from the host 100 and related parameters. A response UPIU with the transaction code of "xx10 0001b" is generated by the device 200, is transmitted to the host 100, and includes the operating status concerning the command of the host 100 and other response information.

On the other hand, the query request UPIU with the transaction code of "xx01 0110b" is generated by the host 100, is transmitted to the device 200, and includes response other than commands and task management functions. A query response UPIU with the transaction code of "xx11 0110b" is generated by the device 200 and transmitted to the host 100, and includes a response to a query request other than the command and task management functions.

More detailed contents thereof may be referred to the UFS interface specification.

In this embodiment, the command priority policy information generated by the command priority policy manager 132 of the host 100 is included in the command UPIU to be transmitted from the host 100 to the device 200, and may be transmitted to the device 200 (S501).

The command priority policy manager 232 of the device 200 identifies the values included in the command priority policy information included in the command UPIU, and determines whether or not the device 200 complies with a predetermined priority in processing the command received from the host 100.

After that, the device 200 may transmit the response UPIU to the host 100 after completing the processing of the command UPIU (S503).

Referring to FIG. 4, an example UPIU 400 transmitted from the host 100 to the device 200 is illustrated. FIG. 4 is illustrated for convenience of explanation, and the internal structure of the UPIU 400 may be different than shown.

A region 402 of the UPIU 400 represents the transaction code described above, and its value is "xx00 0001b". Therefore, it is possible to know that the UPIU 400 is the command UPIU transmitted from the host 100 to the device 200.

The command priority policy manager 132 of the host 100 generates the command priority policy information, and may record the values in the region 404 of the UPIU 400.

Thereafter, the command priority policy manager 232 of the device 200 identifies the values of the command priority policy information recorded in the region 404 of the UPIU 400, and determines whether the device 200 complies with a predetermined priority when processing the command received from the host 100.

Figures 5, 6:
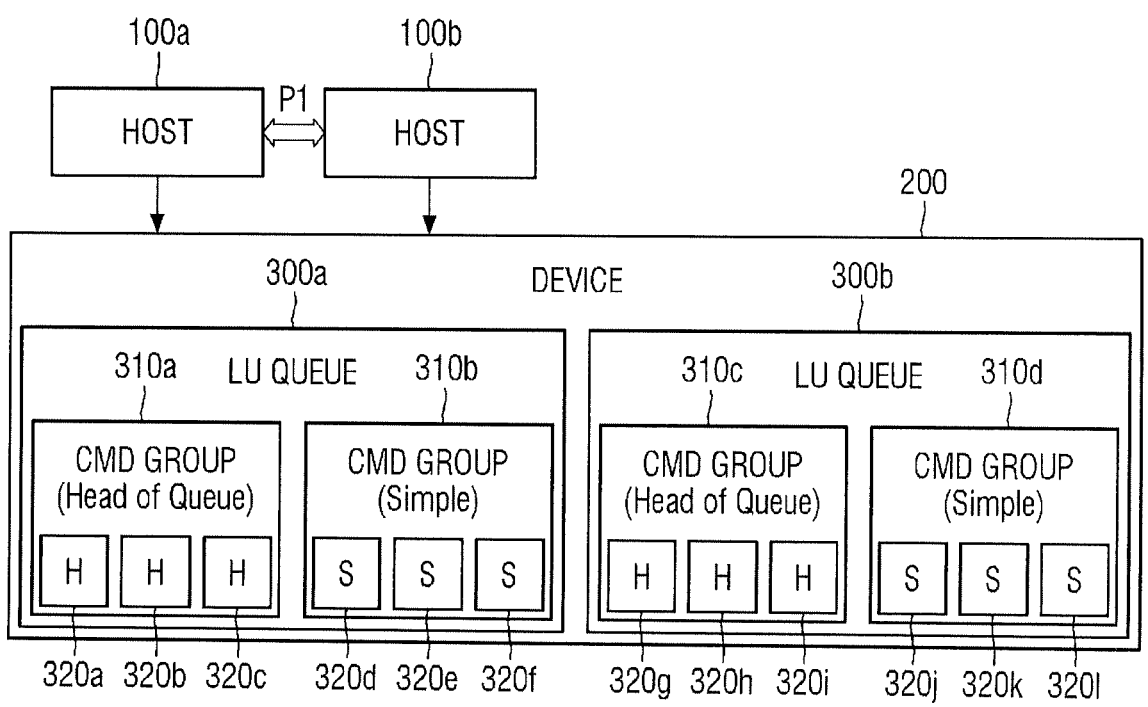

Referring to FIG. 5, an example format of the region 404 of FIG. 4 is illustrated. FIG. 5 is illustrated for convenience of explanation, and the internal structure of the region 404 may be different than shown.

The command priority policy information may be made up of, for example, 8 bits and may be roughly divided into three kinds of fields.

The first field, called "Enable", may include 1 bit of data that may represent 0 and 1. If the first field is a first value (e.g., 0), before the host 100 transmits the UPIU 400 to the device 200, the command priority compliance policy previously set on the device 200 is maintained as-is. That is to say, even if the host 100 transmits the UPIU 400 to the device 200, the existing command priority compliance policy of the device 200 does not change.

Alternatively, if the first field has a second value (e.g., 1), the command priority compliance policy previously set on the device 200 changes, depending on the command priority policy information included in the UPIU 400.

The second field called "Mode" may include 2 bit data that may represent 0, 1, and 2. When the second field is a first value (e.g., 0), the command priority policy information is applied only to n (where n is a natural number) commands.

Alternatively, when the second field is a second value (e.g., 1), the command priority compliance policy changed depending on the command priority policy information is maintained until the device 200 is reset.

Alternatively, when the second field is a third value (e.g., 2), the command priority compliance policy changed depending on the command priority policy information is maintained even after the device 200 is reset.

The third field may include the command priority compliance policy on a plurality of targets. That is to say, the third field includes a first command priority compliance policy on the first target (e.g., "host"), and a second command priority compliance policy on the second target (e.g., "LU"). The command priority compliance policies of each target may be represented by 1 bit data which may express 0 and 1.

In the case where the third field is a first value (e.g., 0), the command priority compliance policy is set as a first policy which allows the device 200 to not comply with the predetermined priority when processing the command. In a case where the third field is a second value (e.g., 1), the command priority compliance policy is set as a second policy which causes the device 200 to comply with the predetermined priority when processing the command.

In particular, referring to FIG. 6 together, in the case of the bit called "Host" having bit number "2", as described in FIG. 2, the "Host" bit may include the value representing the command priority compliance policy concerning the priority P1 between the command received from the first host 100a and the command received from the second host 100b.

In a case where the "Host" bit is a first value (e.g., 0), the command priority compliance policy is set as a first policy which allows the device 200 to not comply with the predetermined priority (P1) when processing the command. In a case where the "Host" bit is a second value (e.g., 1), the command priority compliance policy is set as a second policy which causes the device 200 to comply with the predetermined priority (P1) when processing the command.

Figure 7:
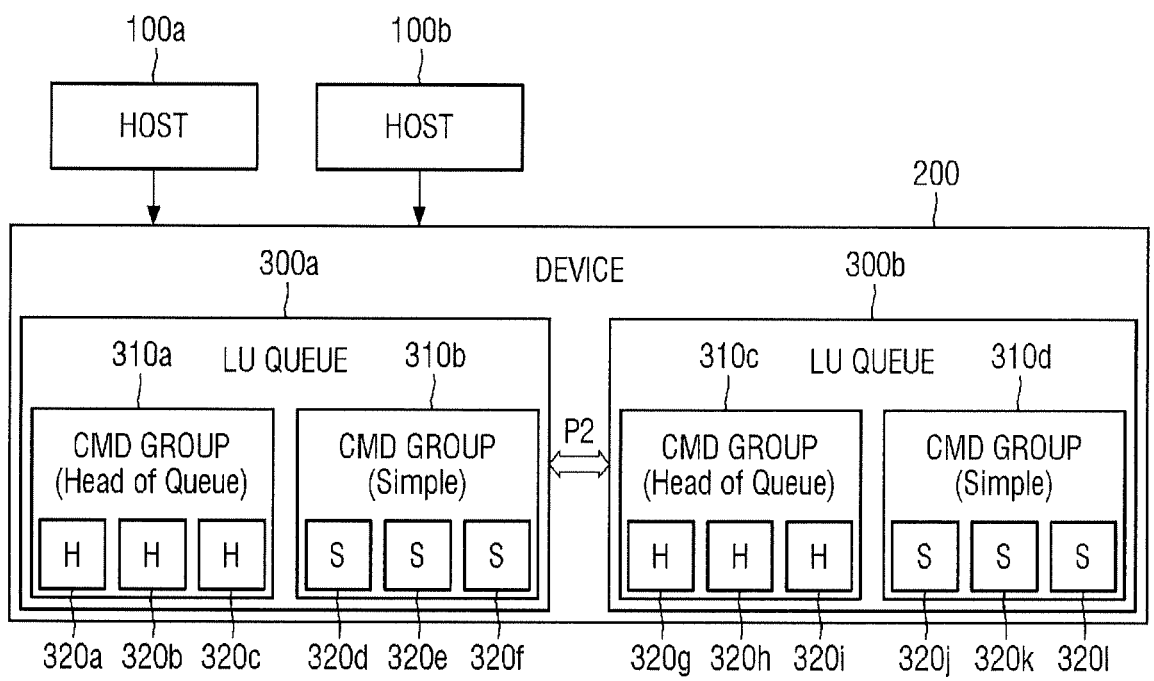

Referring to FIG. 7 together, in the case of the bit called "LU" having bit number "1", as described in FIG. 2, the "LU" bit may include the value representing the command priority compliance policy concerning the priority (P2) between the command included in the first logical unit queue 300a and the command included in the second logical unit queue 300b.

In a case where the "LU" bit is a first value (e.g., 0), the command priority compliance policy is set as a first policy which allows the device 200 to not comply with the predetermined priority (P2) when processing the command. In a case where the "LU" bit is a second value (e.g., 1), the command priority compliance policy is set as a second policy which causes the device 200 to comply with the predetermined priority (P2) when processing the command.

Figure 8:
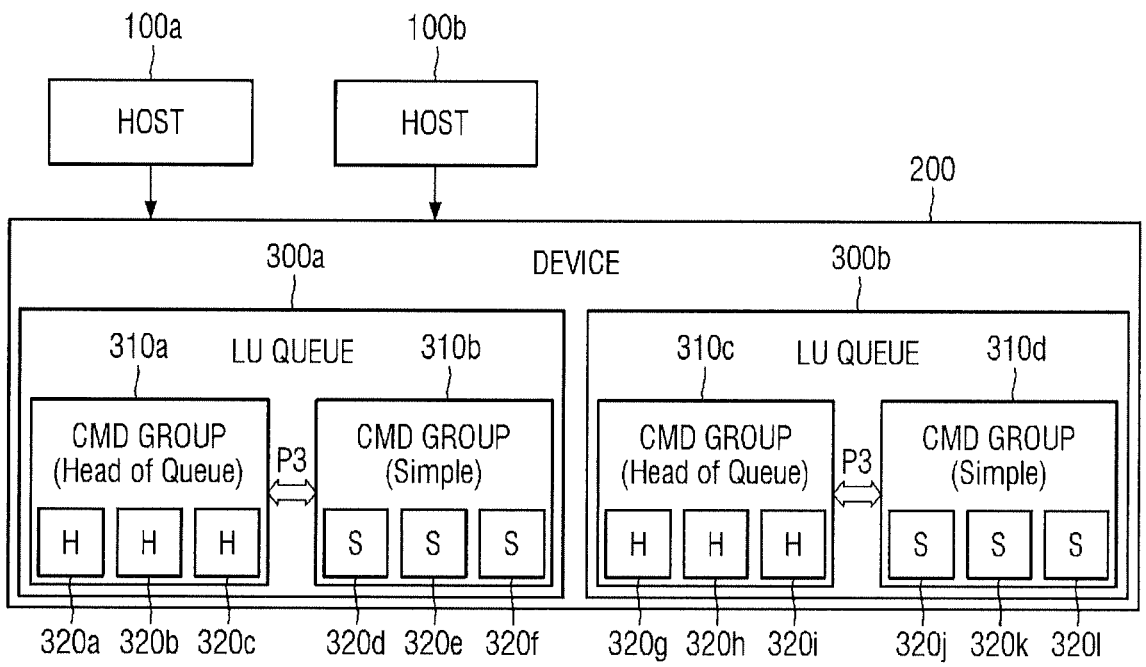

Also referring to FIG. 8 together, in the case of the bit called "CMD Group" having bit number "0", as described in FIG. 2, the "CMD Group" bit may include the value representing the command priority compliance policy concerning the priority (P3) between the command corresponding to the head-of-queue priority and the command corresponding to the simple priority.

In a case where the "CMD Group" bit is a first value (e.g., 0), the command priority compliance policy is set as a first policy which allows the device 200 to not comply with the predetermined priority (P3) when processing the command. In a case where the "CMD Group" bit is a second value (e.g., 1), the command priority compliance policy is set as a second policy which causes the device 200 to comply with the predetermined priority (P3) when processing the command.

In this manner, the semiconductor device and the semiconductor system according to various embodiments of the present invention can normally process the plurality of commands and improve the efficiency, by reflecting the operating status to dynamically determine the command priority compliance.

Figure 9:
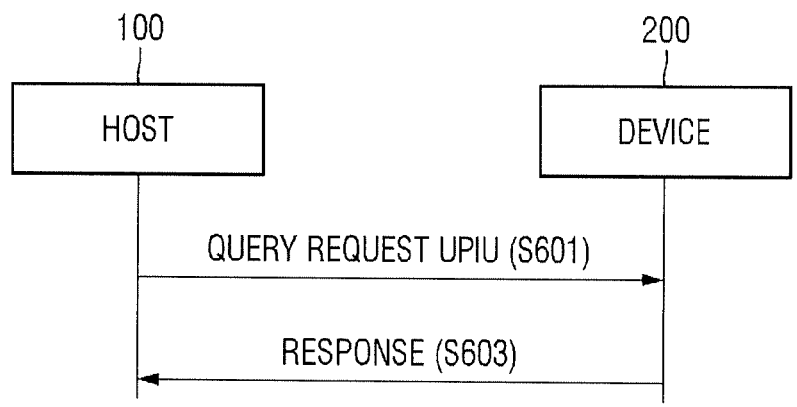
Figures 11, 12:
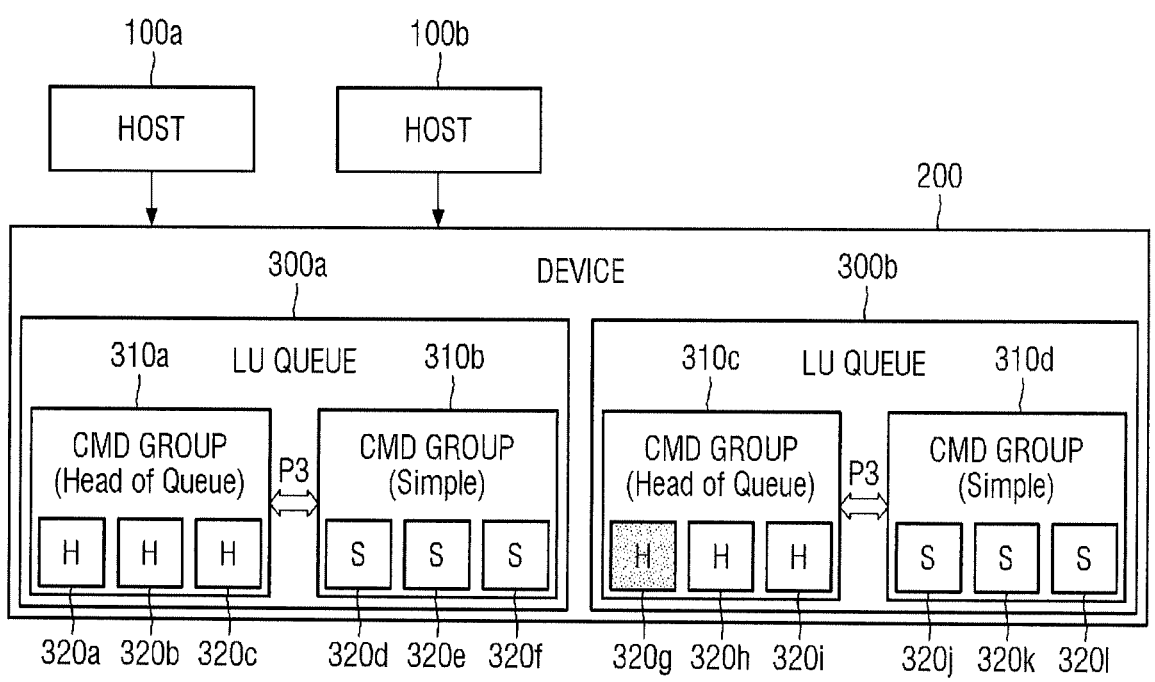

FIGS. 9 through 11 are schematic views for explaining the operation of the semiconductor system according to an embodiment of the present invention.

Referring to FIG. 9, the command priority policy information generated by the command priority policy manager 132 of the host 100 may be transmitted to the device 200, as a separate data structure which is not included in the command transmitted to the device 200 from the host 100.

That is, the command priority policy information generated by the command priority policy manager 132 of the host 100 is included in the query request UPIU transmitted from the host 100 to the device 200, and may be transmitted to the device 200 (S601).

The command priority policy manager 232 of the device 200 identifies the values included in the command priority policy information included in the query request UPIU, and determines whether the device 200 complies with a predetermined priority when processing the command received from the host 100.

Thereafter, the device 200 may transmit the query response UPIU to the host 100 as a response to the query request UPIU (S603).

Referring to FIG. 10, an example UPIU 410 transmitted from the host 100 to the device 200 is illustrated. FIG. 10 is merely illustrated for convenience of explanation, and the internal structure of the UPIU 410 may be different than shown.

The region 412 of the UPIU 410 represents the transaction code described above and its value is "xx01 0110b". Therefore, it is possible to know that the UPIU 410 is a query request UPIU that is transmitted from the host 100 to the device 200.

The command priority policy manager 132 of the host 100 generates the command priority policy information and may record the values thereof in the region 414 of the UPIU 410.

Thereafter, the command priority policy manager 232 of the device 200 identifies the values of the command priority policy information recorded in the region 414 of the UPIU 410, and determines whether to comply with a predetermined priority when the device 200 processes a command received from the host 100.

Referring to FIG. 11, an example format of the region 414 of FIG. 10 is illustrated. FIG. 11 is illustrated for convenience of explanation, and the internal structure of the region 414 may be different than shown. The description of the format of FIG. 11 is a duplicate of the description of FIG. 5.

In this manner, the semiconductor device and the semiconductor system according to various embodiments of the present invention can normally process a plurality of commands to improve the efficiency, by dynamically determining the command priority compliance even at any timing when the host 100 does not transmit the command to the device 200.

Figure 13:
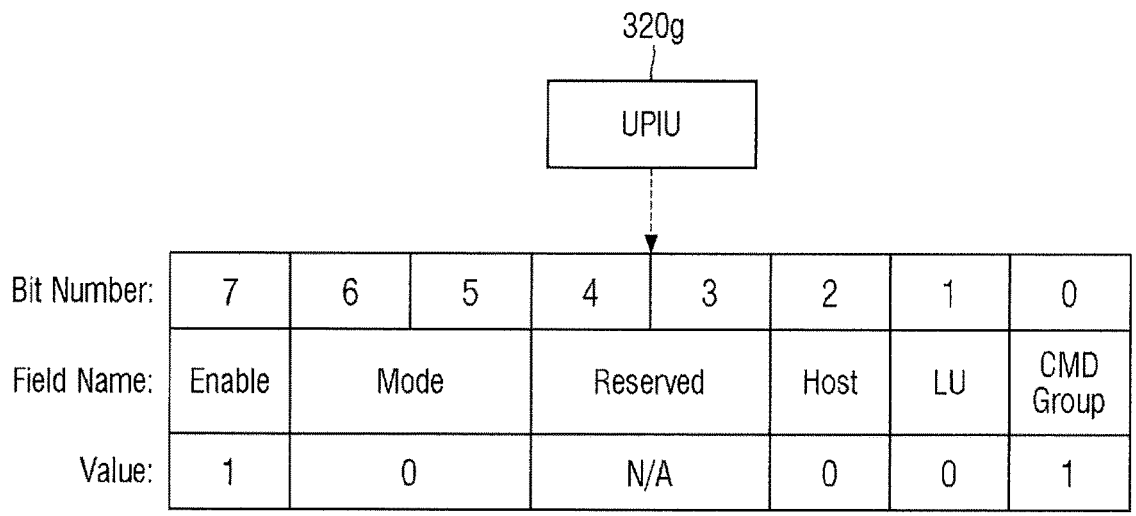
Figure 14:
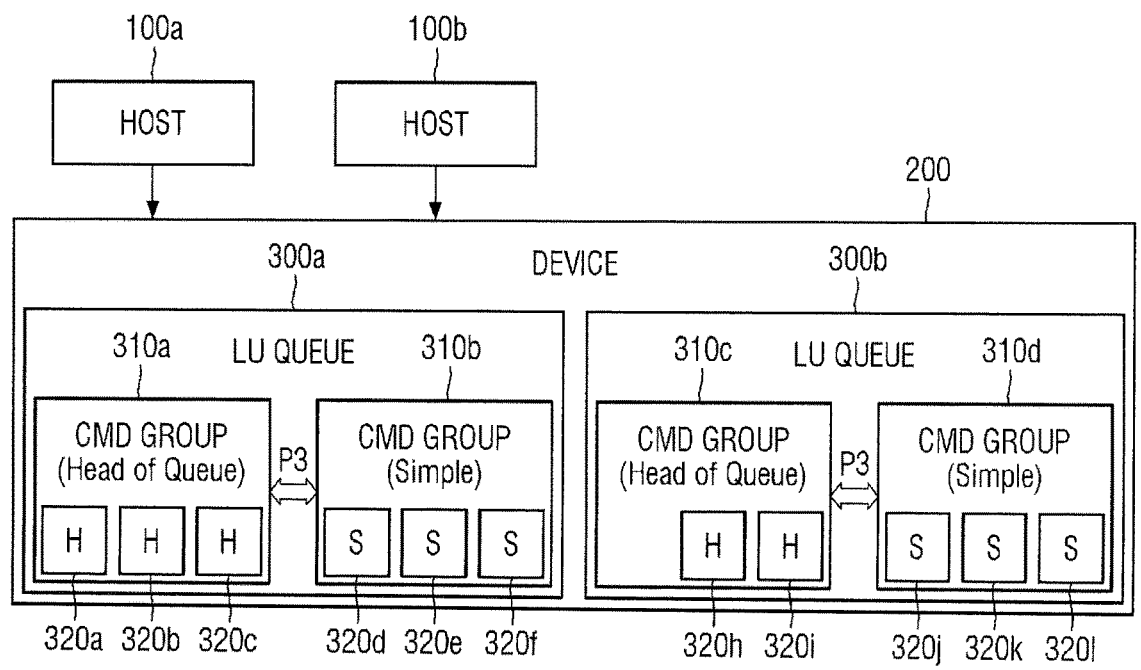

FIGS. 12 through 14 are schematic views for explaining the operation of the semiconductor system according to an embodiment of the present invention.

FIG. 12 illustrates a case where the device 200, which is set in the first policy that may not comply with the priority (P3) between the command corresponding to the head-of-queue priority and the command corresponding to the simple priority, receives a command 320g from the host 100.

Referring to FIG. 13, the command priority policy information included in the command 320g includes data in which a value of the first field called "Enable" is 1, the value of the second field called "Mode" is 0, the value of "Host" in the third field is 0, the value of "LU" is 0, and the value of "CMD group" is 1.

Since the value of the first field is 1, the command priority compliance policy previously set on the device 200, that is, the first policy that may not comply with the priority (P3) may change, depending on the command priority policy information contained in the command 320g.

Next, the command priority policy information, in which the value of the second field is changed to 0, is applied only to n commands (where n is a natural number). Assuming that n=1 is set as an example, the changed command priority policy information is applied only to the case of processing one command.

Next, in the case of the third field, since the value of "CMD group" is 1, the command priority compliance policy will be set as the second policy which causes the device 200 to comply with the predetermined priority (P3) when processing the command.

After the device 200 processes the command 320g in accordance with such a policy, as illustrated in FIG. 14, the command 320g will be removed from the command group 310c, and the changed command priority policy information is applied only to the case of processing one command. Accordingly, thereafter, the device 200 may be set as the first policy again which may not comply with the priority (P3).

Figure 15:
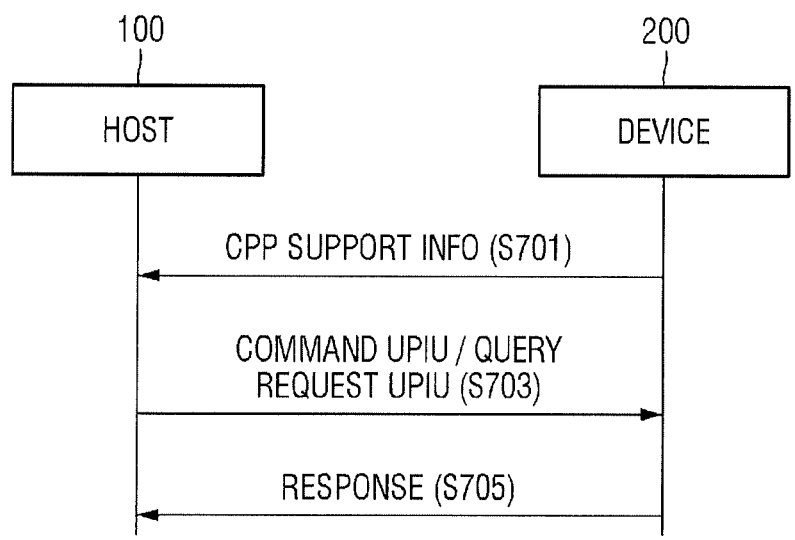
FIG. 15 is a schematic view for explaining the operation of the semiconductor system according to an embodiment of the present invention.

FIG. 15 is a schematic view for explaining the operation of the semiconductor system according to an embodiment of the present invention.

Referring to FIG. 15, the host 100 may receive command priority policy support information (CPPSI) from the device 200. Here, the command priority policy support information is information indicating whether the device 200 may process the command priority policy information provided by the host 100.

The command priority policy support information may include command priority policy support information about multiple targets. That is to say, the command priority policy support information may include first command priority policy support information on the first target (e.g., "host"), and second command priority policy support information on the second target (e.g., "LU").

The host 100 may receive the command priority policy support information from the device 200 before transmitting the command priority policy information to the device 200 (S701).

If the device 200 cannot process the command priority policy information provided by the host 100 at all, the host 100 may not transmit the command priority policy information to the device 200.

Alternatively, if the device 200 can process the command priority policy information provided by the host 100, the command priority policy information generated by the command priority policy manager 132 of the host 100 may be included in the command UPIU or the query request UPIU transmitted from the host 100 to the device 200, and may be transmitted to the device 200 (S703).

The command priority policy manager 232 of the device 200 identifies the values included in the command priority policy information included in the command UPIU or the query request UPIU, and determines whether the device 200 complies with a predetermined priority when processing a command received from the host 100.

In particular, in a case where the device 200 can process the command priority policy information provided by the host 100 only on some targets (e.g., "Host"), it is determined whether to comply with a predetermined priority when the device 200 processes the command received from the host 100 only on the target (e.g., "Host").

Thereafter, the device 200 may transmit the response UPIU or the query response UPIU to the host 100, as the response to the command UPIU or the query request UPIU (S705).

Figure 16:
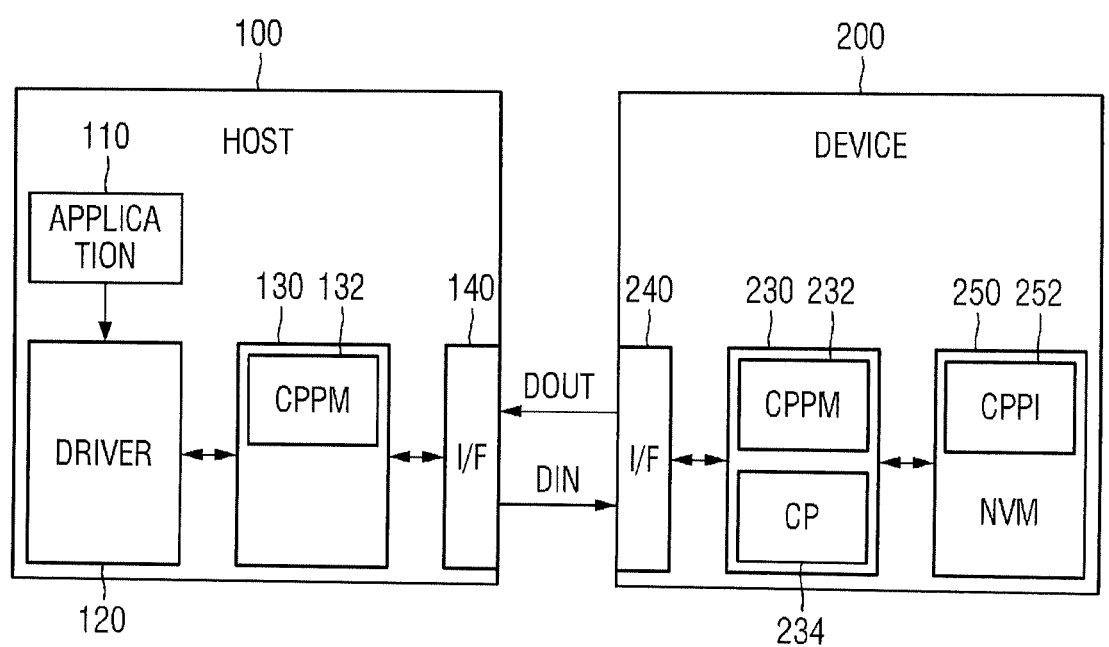
FIG. 16 is a schematic view for explaining the semiconductor system according to an embodiment of the present invention.

FIG. 16 is a schematic view for explaining a semiconductor system according to an embodiment of the present invention.

Referring to FIG. 16, a region 252 in which the command priority policy information described above can be recorded may be defined in a nonvolatile memory 250 of the device 200.

As described previously with reference to FIG. 5, when the second field called "Mode" is the third value (e.g., 2) in the command priority policy information, the command priority compliance policy changed in accordance with the command priority policy information is maintained even after the device 200 is reset.

In this case, the command priority policy information may be recorded in the region 252 of the nonvolatile memory 250 before the device 200 performs the reset operation.

The command priority policy information recorded in the region 252 of the nonvolatile memory 250 is read during the reset operation of the device 200 and may be transmitted to the command priority policy manager 232. Then, the command priority policy manager 232 may determine whether the device 200 complies with a predetermined priority when processing the command received from the host 100 on the basis of the command priority policy information.

Figure 17:
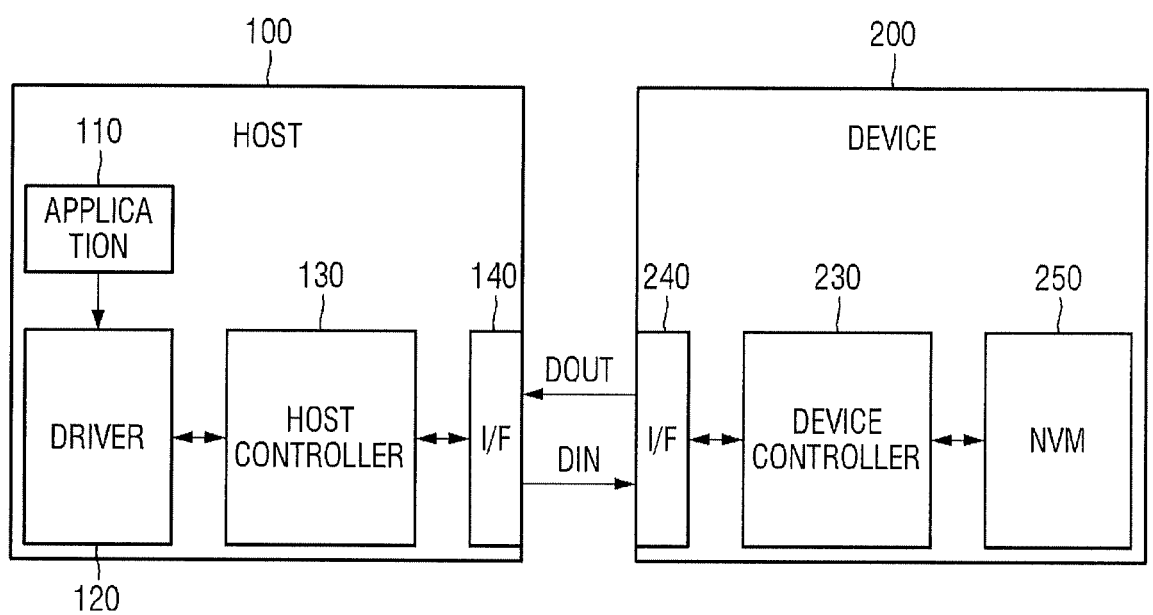
FIG. 17 is a schematic view for explaining the semiconductor system according to an embodiment of the present invention.

FIG. 17 is a schematic view for explaining a semiconductor system according to an embodiment of the present invention.

Referring to FIG. 17, as described above, the command priority policy manager 132 of the host 100 is provided inside the host controller 130, and the command priority policy manager 232 of the device 200 and the command parser 234 may be provided inside the device controller 230, but these elements may also be provided as software such as applications and firmware executed on the host 100 and the device 200.

The semiconductor devices and the semiconductor systems according to various embodiments of the present invention explained so far can dynamically determine the command priority compliance by reflecting the operating status to normally process a plurality of commands and improve the efficiency.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A memory device comprising:
a device interface circuit configured to receive command priority policy information from a host via an electrical interface, the command priority policy information including a command priority compliance policy for a command received from the host; and
a command priority policy manager circuit configured to determine whether to comply with a predetermined priority for processing the command received from the host in accordance with the command priority policy information received from the host,
wherein the memory device is configured to transmit command priority policy support information which indicates whether to process the command priority policy information of the received command, to the host through the device interface circuit.

2. The memory device of claim 1, wherein the command priority policy information is included in the command received from the host.

3. The memory device of claim 1, wherein the command priority policy information is a data structure which is not included in the command received from the host.

4. The memory device of claim 1, wherein the memory device is configured such that the command priority policy support information is transmitted to the host before receiving the command priority policy information from the host.

5. The memory device of claim 4, wherein the memory device includes a first logical unit queue and a second logical unit queue, and
wherein the command priority policy support information comprises:
first command priority policy support information for a priority between a command received from the host and a command received from an additional host; and
second command priority policy support information for a priority between a command included in the first logical unit queue and a command included in the second logical unit queue.

6. The memory device of claim 1, wherein the command priority policy information comprises a first field having a first value or a second value,
wherein, when the first field is the first value, the command priority policy manager circuit maintains a command priority compliance policy set previously, and
wherein, when the first field is the second value, the command priority policy manager circuit changes the command priority compliance policy set previously, in accordance with the command priority policy information of the command received from the host.

7. The memory device of claim 1, wherein the command priority policy information comprises a second field having a first value, a second value, or a third value,
wherein, when the second field is the first value, the command priority compliance policy changed in accordance with the command priority policy information is applied only to n (n is a natural number) commands,
wherein, when the second field is the second value, the command priority compliance policy changed in accordance with the command priority policy information is maintained until the memory device is reset by a first reset operation, and
wherein, when the second field is the third value, the command priority compliance policy changed in accordance with the command priority policy information is maintained after the memory device is reset by a second reset operation.

8. The memory device of claim 7, further comprising a nonvolatile memory,
wherein, when the second field is the third value, the command priority policy information is recorded in the nonvolatile memory before the memory device performs a reset operation of the memory device, and
wherein the command priority policy information recorded in the nonvolatile memory is read during the reset operation of the memory device and is transmitted to the command priority policy manager circuit.

9. The memory device of claim 1, wherein the command priority policy information comprises a third field having a first value or a second value,
wherein, when the third field is the first value, the command priority compliance policy is set as a first policy to allow the memory device to not comply with the predetermined priority in processing the command, and
wherein, when the third field is the second value, the command priority compliance policy is set as a second policy which causes the memory device to comply with the predetermined priority in processing the command.

10. The memory device of claim 9, wherein the memory device includes a first logical unit queue and a second logical unit queue, and
wherein the third field comprises:
a first command priority compliance policy for a priority between a command received from the host and a command received from an additional host; and
a second command priority compliance policy for a priority between a command included in the first logical unit queue and a command included in the second logical unit queue.

11. A semiconductor system comprising:
a host and a memory device connected to each other via an electrical interface,
wherein the host includes:
a first command priority policy manager circuit configured to generate command priority policy information including a command priority compliance policy on a command to be processed by the memory device; and
a host interface circuit, coupled to the first command priority policy manager circuit, configured to receive the command priority policy information from the first command priority policy manager circuit and to transmit the command priority policy information to the memory device,
wherein the memory device includes:
a device interface circuit configured to receive the command priority policy information from the host; and
a second command priority policy manager circuit, coupled to the device interface circuit, the second command priority policy manager circuit configured to determine whether to comply with a predetermined priority for processing the command received from the host, in accordance with the command priority policy information received from the host, and
wherein the memory device is configured to transmit command priority policy support information which indicates whether to process the command priority policy information of the received command, to the host through the device interface circuit.

12. The semiconductor system of claim 11, wherein the command priority policy information is included in the command transmitted from the host to the memory device.

13. The semiconductor system of claim 11, wherein the command priority policy information is a data structure which is not included in the command transmitted from the host to the memory device.

14. The semiconductor system of claim 11, wherein the memory device is configured such that the command priority policy support information is transmitted to the host before receiving the command priority policy information from the host.

15. The semiconductor system of claim 14, wherein the memory device includes a first logical unit queue and a second logical unit queue, and
wherein the command priority policy support information comprises:
first command priority policy support information for a priority between a command received from the host and a command received from an additional host; and
second command priority policy support information for a priority between a command included in the first logical unit queue and a command included in the second logical unit queue.

16. The semiconductor system of claim 11, wherein the command priority policy information comprises a first field having a first value or second value,
wherein, when the first field is the first value, the second command priority policy manager circuit maintains a command priority compliance policy set previously, and
wherein, when the first field is the second value, the second command priority policy manager circuit changes the command priority compliance policy set previously, in accordance with the command priority policy information of the command received from the host.

17. The semiconductor system of claim 11, wherein the command priority policy information comprises a second field having a first value, a second value, or a third value,
wherein, when the second field is the first value, the command priority compliance policy changed in accordance with the command priority policy information is applied only to n (n is a natural number) commands,
wherein, when the second field is the second value, the command priority compliance policy changed in accordance with the command priority policy information is maintained until the memory device performs a first reset operation, and
wherein, when the second field is the third value, the command priority compliance policy changed in accordance with the command priority policy information is maintained after the memory device performs a second reset operation.

18. The semiconductor system of claim 17, wherein the memory device further comprises a nonvolatile memory,
wherein, when the second field is the third value, the command priority policy information is recorded in the nonvolatile memory before the memory device performs a third reset operation, and
wherein the command priority policy information recorded in the nonvolatile memory is read during the third reset operation of the memory device and transmitted to the second command priority policy manager circuit.

19. The semiconductor system of claim 11, wherein the command priority policy information comprises a third field having a first value, a second value, or a third value,
wherein, when the third field is the first value, the command priority compliance policy is set as a first policy which allows the memory device to not comply with the predetermined priority in processing the command, and
wherein, when the third field is the second value, the command priority compliance policy is set as a second policy which causes the memory device to comply with the predetermined priority in processing the command.

20. The semiconductor system of claim 19, wherein the memory device includes a first logical unit queue and a second logical unit queue, and
wherein the third field comprises:
a first command priority compliance policy for a priority between a command received from the host and a command received from an additional host; and
a second command priority compliance policy for a priority between a command included in the first logical unit queue and a command included in the second logical unit queue.

* * * * *